Nov. 29, 1932.    J. RAH    1,889,570
POTHEAD
Filed May 31, 1927
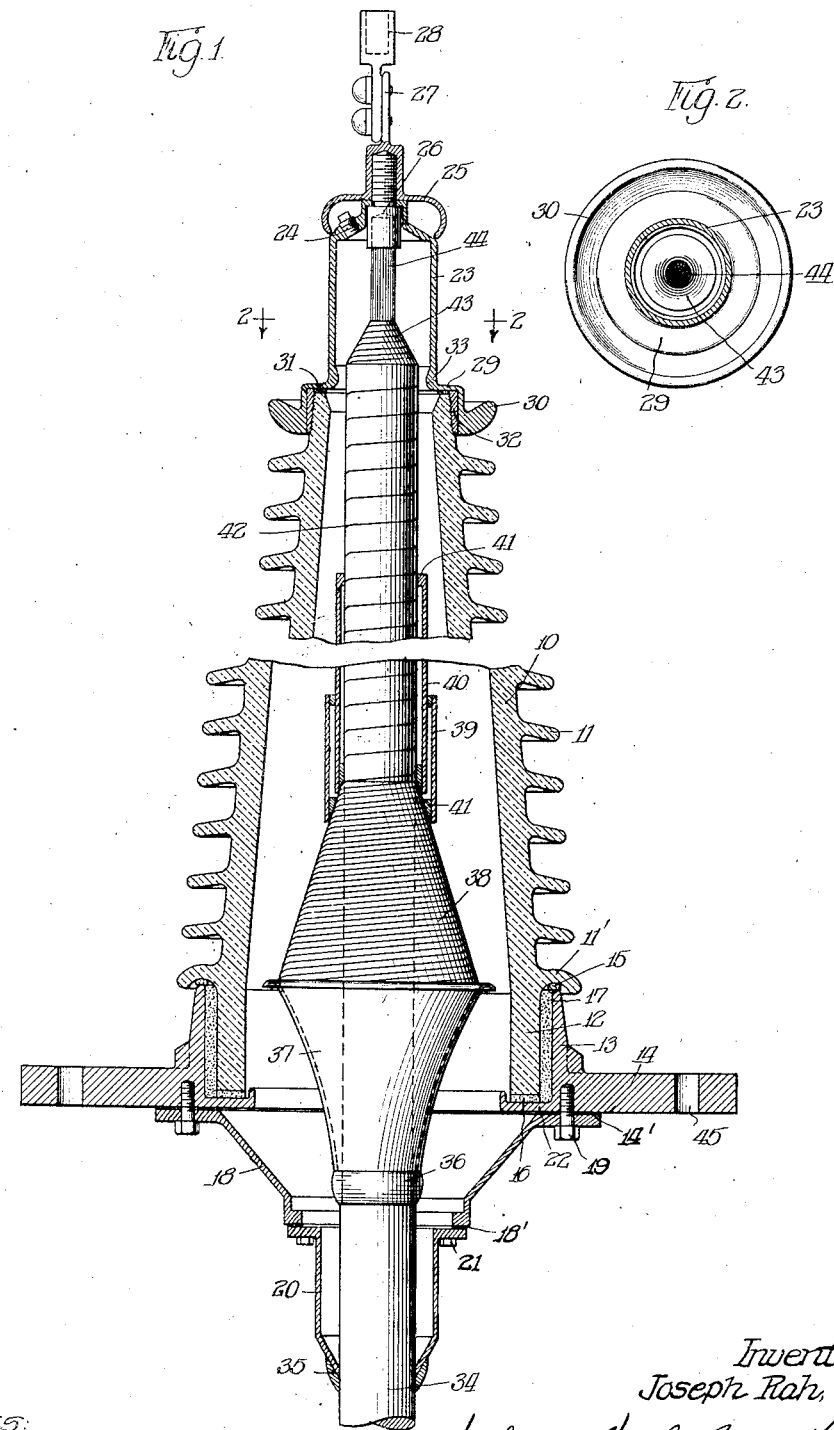
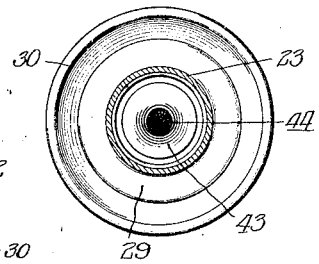
Inventor:
Joseph Rah, Patented Nov. 29, 1932

1,889,570

UNITED STATES PATENT OFFICE

JOSEPH RAH, OF CHICAGO, ILLINOIS, ASSIGNOR TO G AND W ELECTRIC SPECIALTY COMPANY, OF CHICAGO, ILLINOIS, A CORPORATION OF ILLINOIS

POTHEAD

Application filed May 31, 1927. Serial No. 195,360.

The invention pertains to an insulating connector, and particularly to a novel cap connection for connectors of the pothead type.

An object of the invention is to provide a simple, safe, durable and efficient pothead arrangement whereby the portion of the cable within the pothead not covered by sheathing, and the metal cap of the pothead are safe from rupture.

Another object is to provide a novel cap for a pothead bushing of such character as will relieve the stresses in the cable, especially adjacent the termination of the insulation and adjacent the junction of the bushing and the cap.

A further object is to provide a pothead arrangement adapted to meet all the requirements for successful commercial use.

Other and more specific objects will be readily apparent from the specification, claim and drawing appended hereto.

In the drawing, wherein like reference characters are used to designate like parts—

Figure 1 is a sectional elevation through the pothead, showing the disposition of the parts thereof, and Figure 2 is a sectional plan through the metal cap or head, taken substantially on the plane indicated by the line 2—2 of Figure 1.

In the pothead arrangement, the usual tapered insulating bushing 10 is provided with the petticoats 11 and terminates in a lower cylindrical portion 12 adapted to fit in the surrounding collar 13 of the base or bracket 14. This bracket is provided with holes 45 for fastening to a support and is provided with an annular flanged lug 22 for supporting the bushing through a cork gasket 16 shellacked on both sides and cemented under pressure. A similar gasket 15 treated in a similar manner is provided between the upstanding annular portion or collar and the lower petticoat 11'. An adapter 18 is fastened by any means such as the bolt or screw 19 to the base 14, the cork gasket 14' being disposed between the adapter and the base. A wiping sleeve 20 is fastened to the adapter by means such as the bolt 21, there being disposed a cork gasket 18' between said parts.

There is provided a metal cap 23 for closing the top of the bushing, said cap having a vent plug 24 and a hooped lug 25 having threaded engagement with a cable lug 26. The hooped lug is provided with an upstanding portion 27 adapted to be attached to an external cable lug 28. The vertical wall of the metal cap 23 is provided with a shoulder 29 which is reflanged to form a petticoat-shaped member 30. This cap is spaced from the top of the bushing by means of a cork gasket 31 and is cemented or otherwise secured to the bushing by any means such as represented at 32. The junction between the vertical wall and the shoulder 29 of the cap is thickened, preferably inwardly to form an annular bulbous protuberance or knuckle 33.

The sheathed cable 34 extends through the wiping sleeve 20, there being provided a wiped joint 35 between the cable sheathing and said sleeve, and the sheathing is also wiped to a metal tapered member 37 through the wipe 36. It will be understood that above the wipe 36 the metal sheathing is discontinued so that only the wrapping 42 extends thereabove, therefore, it has been found desirable to form a conical wrapping 38 of cotton tape extending from the member 37 to a substantial distance upward within the bushing. Impregnated telescopical paper tubes 39 and 40, spaced from each other by impregnated paper spacers 41, are provided extending upward from the cotton wrapping to a substantial distance within the bushing. Adjacent the knuckle or bulbous portion 33 of the cap, the insulation 42 terminates in a pencilling 43 so that the portion 44 extending above this pencilling and fastened to the cable lug 26 is bare cable wire. It is to be understood that there is an opening provided in the adapter for connection to the usual oil reservoir for maintaining the insulating or dielectric fluid within the bushing at all times while said bushing may be in use.

As is well known, when a current carrying cable wire is surrounded by a casing, there are stresses set up in the wire insulation and in the casing, as may be represented by lines of force running between the cable 44 and the vertical wall of the cap 23 perpendicular thereto, and these stresses will be set up in spite of the fact that there is an insulating or dielectric material between said members, and it has been found that if the shoulder 29 of the cap is joined to the vertical portion of the wall 23 by simply a sharp corner or knuckle, that due to this sharp corner there is concentrated severe disrupting forces which may be represented as lines which run to said corner perpendicular to the current carrying wire and running to said corner in an angular direction from said wire, the amount varying according to the load carried. It is to obviate these disrupting forces that the bulbous knuckle 33 is provided, and it will be readily appreciated that due to this bulbous knuckle, there is a negligible concentration of forces from the point or line of the knuckle; on the contrary, these lines of force will be distributed over the bulbous surface thereby greatly reducing chances of disruption due to this device over a device where a sharp knuckle is provided, the same load being carried in the cable in each case.

By means of the arrangement hereinabove described, an improved pothead is provided which is adapted to more successfully meet all the requirements for commercial use, and it is to be understood that I do not wish to be limited by the exact embodiment shown as other and various embodiments of the device will be apparent to those skilled in the art.

I claim:

In a cap for an insulating bushing the combination of a substantially cylindrical body portion having a conical portion forming a substantial closure for one end of said cap, annular supporting and securing portions integral with said body portion said annular supporting portion being angularly disposed with respect thereto, and a stress relieving protuberance formed at the junction of the body portion and said annular supporting portion.

Signed at Chicago, Illinois, this 24 day of May, 1927.

JOSEPH RAH.